(12) United States Patent
Jiang et al.

(10) Patent No.: US 10,715,622 B2
(45) Date of Patent: Jul. 14, 2020

(54) SYSTEMS AND METHODS FOR ACCELERATING OBJECT STORES WITH DISTRIBUTED CACHING

(71) Applicant: Nutanix, Inc., San Jose, CA (US)

(72) Inventors: Dezhou Jiang, San Jose, CA (US); Manik Taneja, Bangalore (IN); Ranjan Parthasarathy, Milpitas, CA (US); Xingchi Jin, Union City, CA (US)

(73) Assignee: NUTANIX, INC., San Jose, CA (US)

( * ) Notice: Subject to any disclaimer, the term of this patent is extended or adjusted under 35 U.S.C. 154(b) by 74 days.

(21) Appl. No.: 16/221,422

(22) Filed: Dec. 14, 2018

(65) Prior Publication Data

US 2020/0195743 A1 Jun. 18, 2020

(51) Int. Cl.
*H04L 29/08* (2006.01)
*G06F 12/123* (2016.01)
*H04L 12/66* (2006.01)
*G06F 12/0864* (2016.01)

(52) U.S. Cl.
CPC ...... *H04L 67/2842* (2013.01); *G06F 12/0864* (2013.01); *G06F 12/123* (2013.01); *H04L 12/66* (2013.01); *G06F 2212/254* (2013.01)

(58) Field of Classification Search
CPC . H04L 67/2842; H04L 12/66; G06F 12/0864; G06F 12/123
See application file for complete search history.

(56) References Cited

U.S. PATENT DOCUMENTS

| | | | |
|---|---|---|---|
| 8,484,259 B1 | 7/2013 | Makkar et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,930,648 B1 * | 1/2015 | Storer | G06F 12/0292 711/154 |
| 9,772,866 B1 | 9/2017 | Aron et al. | |
| 2004/0162885 A1 * | 8/2004 | Garg | G06F 16/27 709/213 |

(Continued)

FOREIGN PATENT DOCUMENTS

EP 2 837 134 2/2015

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Ryan Bertram
(74) *Attorney, Agent, or Firm* — Foley & Lardner LLP

(57) ABSTRACT

An illustrative embodiment disclosed herein is an object store with distributed caching including a distributed cache cluster including a first cache on a first node device and a second cache on a second node device. The object store with distributed caching further includes a gateway server communicatively coupled to the distributed cache cluster. The gateway server receives a request to store an object from a client device, determines whether the object satisfies an object policy, determines whether the request indicates that the object is to be split up into a plurality of shards, and stores a first shard of the plurality of shards in the first cache and a second shard of the plurality of shards in the second cache.

27 Claims, 4 Drawing Sheets

(56) References Cited

U.S. PATENT DOCUMENTS

| | | | | |
|---|---|---|---|---|
| 2015/0271284 A1* | 9/2015 | Hindawi | .................. | H04L 67/32 709/213 |
| 2015/0271285 A1* | 9/2015 | Hindawi | ............. | H04L 67/1089 709/213 |
| 2015/0309942 A1* | 10/2015 | Moretti | ............... | G06F 9/45558 711/128 |
| 2016/0191508 A1 | 6/2016 | Bestler et al. | | |
| 2017/0249310 A1* | 8/2017 | Kumar | .............. | G06F 16/24552 |
| 2018/0167486 A1* | 6/2018 | Pacella | .............. | H04L 67/2842 |
| 2018/0368123 A1* | 12/2018 | Mistry | .............. | H04W 72/0406 |
| 2019/0171373 A1* | 6/2019 | Frank | ................... | G06F 3/0608 |
| 2019/0349427 A1* | 11/2019 | Rago | .................. | H04L 67/1097 |
| 2019/0369890 A1* | 12/2019 | Danilov | ................ | G06F 3/0604 |
| 2020/0068038 A1* | 2/2020 | Xing et al. | .......... | H04L 67/1097 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

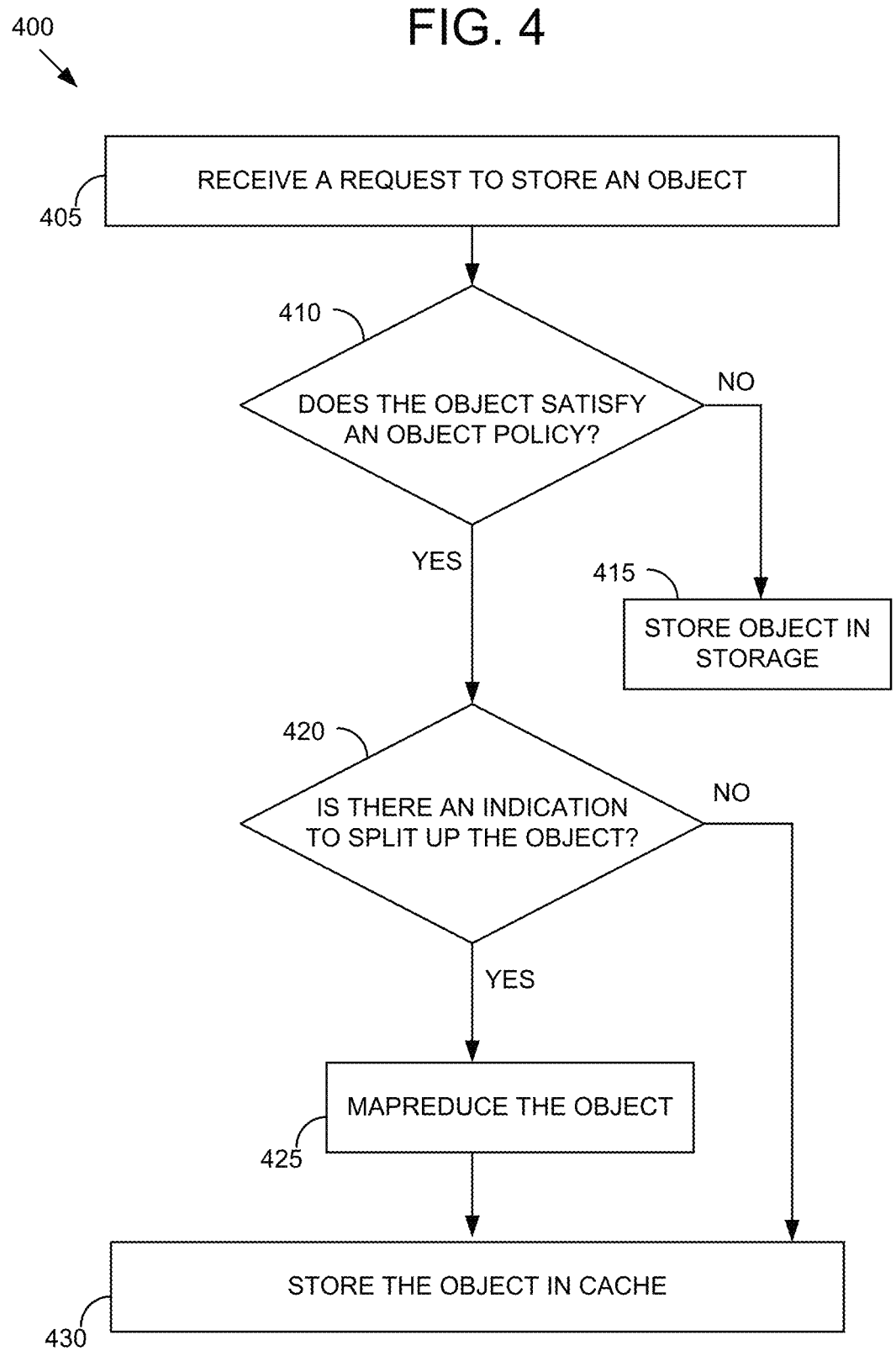

SYSTEMS AND METHODS FOR ACCELERATING OBJECT STORES WITH DISTRIBUTED CACHING

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to systems and methods for accelerating object stores with distributed caching. Technical advantages include, lower latency, better processor utilization, lower power consumption, lower disk utilization, less frequent disk failures, and better performance for several use-cases.

An illustrative embodiment disclosed herein is an object store with distributed caching including a distributed cache cluster including a first cache on a first node device and a second cache on a second node device. The object store with distributed caching further includes a gateway server communicatively coupled to the distributed cache cluster. The gateway server receives a request to store an object from a client device, determines whether the object satisfies an object policy, determines whether the request indicates that the object is to be split up into a plurality of shards, and stores a first shard of the plurality of shards in the first cache and a second shard of the plurality of shards in the second cache.

Another illustrative embodiment disclosed herein is a method including receiving, by a gateway server, a request to store an object from a client device. The method includes determining, by the gateway server, whether the object satisfies an object policy. The method includes determining, by the gateway server, whether the request indicates that the object is to be split up into a plurality of shards. The method includes storing, by the gateway server, a first shard of the plurality of shards in a first cache of a distributed cache cluster and a second shard of the plurality of shards in a second cache of the distributed cache cluster. The first cache is located on a first node device, and the second cache is located on a second node device.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 is an example method for storing an object in a distributed cache, in accordance with some embodiments of the present disclosure.

Figure 1:
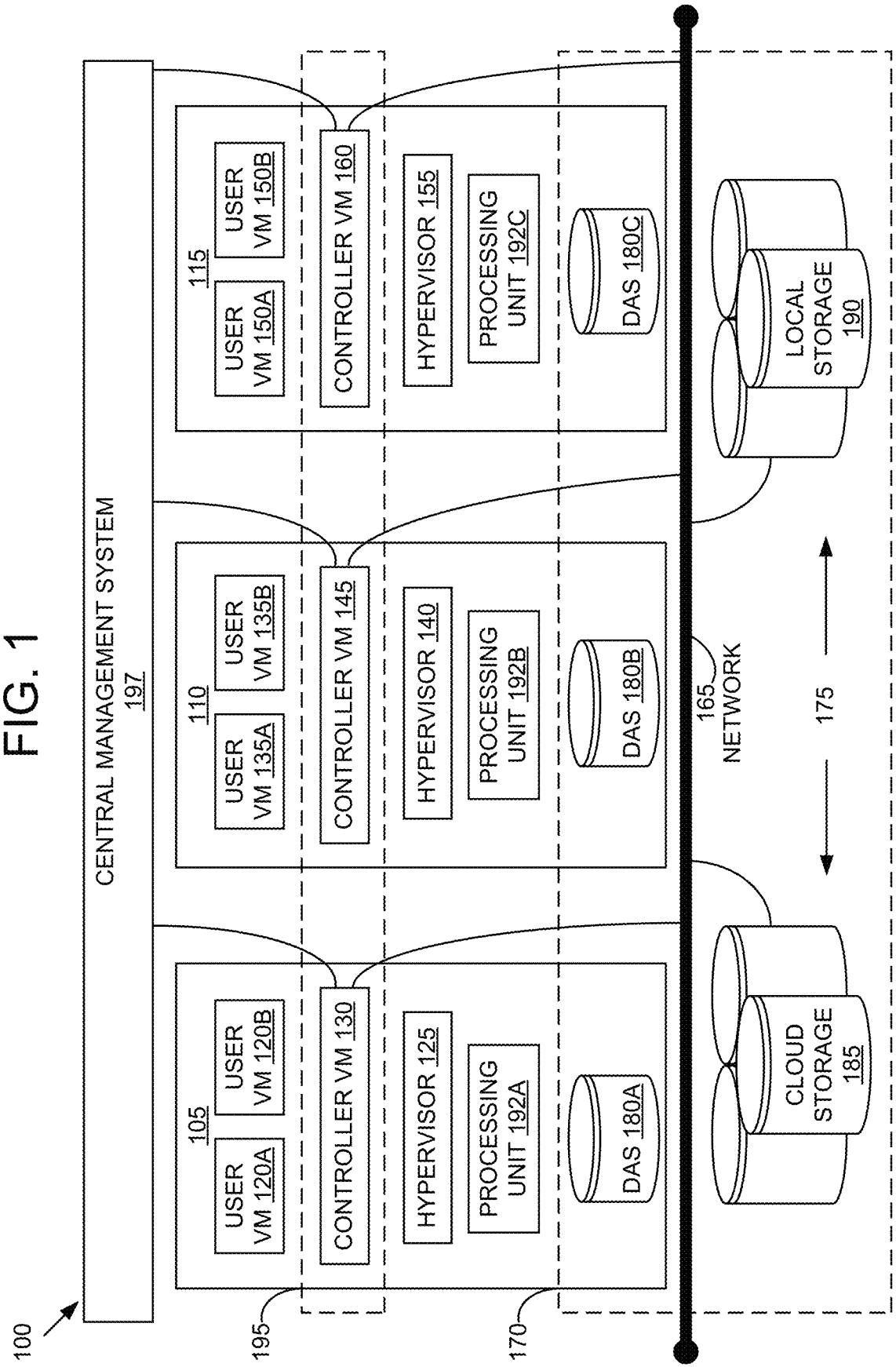
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Most common object store solutions tend to suffer from high latency. The latency may be highest for many applications that need to perform a large number of input/output (I/O) operations on a large number of small or short lived files pursuant to a request. The object store has to know the exact path and how to open each and every file, even if all of the files are in one directory or most of the files, like metadata, are hidden. The object store has to relay the request through several components to reach the persistent storage. There may be additional network latency if the persistent storage is in a remote server. The operations may be taxing in terms of the sheer number of elements to process, the memory required, and ultimately, the latency associated with the request. High latency leads to idling compute resources and an increase in power consumption of servers housing the compute resources. There is a technical challenge of reducing the latency associated with object stores. Furthermore, because all of the data of object stores are served from persistent storage, there is a lot higher utilization and wear and tear of the persistent storage, resulting in more frequent disk failures. There is a need to reduce the disk failures resulting from pervasive use by object store solutions.

The disclosure described herein is directed to systems and methods for accelerating object stores with distributed caching. Object data and metadata below a certain size may be stored in a distributed cache cluster. A gateway server receives an object read or write request. The gateway server forwards the request to the distributed cache cluster. The distributed cache cluster services the request by reading or writing the data. Least recent data may be evicted from the distributed cache cluster and may be stored in persistent storage.

The present disclosure includes a technical solution to the technical challenge of reducing latency of object storage. A technical advantage of the present disclosure is that I/O operations require fewer network hops than those of traditional solutions. Furthermore, the distributed memory is physically closer to the processor of the request than in traditional scenarios. Thus, the object store operation has less latency than traditional systems. The low-latency applications will result in a more efficient utilization of compute resources and a reduction in power consumption. Furthermore, by serving data from the cache instead of the underlying disk, there would be a decrease in the persistent storage (e.g. disk) utilization, in terms of input/output per second, and a decrease in wear and tear. Thus, the mean time between failures (MTBF) of the underlying persistent storage is reduced.

Another technical advantage is that, by having objects served from a cache, the present disclosure is viable for a large class of applications that object stores are currently not suited for. For example, the present disclosure solves the small file problem that most map-reduce systems (e.g. Hadoop) encounter. By storing and retrieving the large quantity of small objects in the distributed cache cluster, there is a significant reduction in the latency overhead associated with serving the storage or retrieval request. In another example, the present disclosure may reduce latency associated with WORM (write once read only) buckets. WORM buckets are used to store objects in a non-rewritable and non-erasable format. Also, the present disclosure may improve latency associated with versioning and managing versioned objects. In the versioning use-case, when an object is updated or written to, the object store creates a new object with a new version and makes an old version of the object read-only. All of these use cases may have better performance characteristics, such as latency, bandwidth, CPU utilization, and/or MTBF as a result of serving the objects from cache instead of persistent storage.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure. Some additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Objects

A preliminary discussion of objects follows. Data can be stored as blocks, files, and/or objects. An object is classified as unstructured data. The object may include data, metadata, one or more variables, one or more functions, and/or one or more methods. The metadata may include a unique identifier, time stamps (e.g. time the object was created, time the object was modified), type of data, user permission indicators, a hashing algorithm, and/or the like. The metadata may be configurable based on an object policy. The object may be referenced by the unique identifier. The unique identifier may include a uniform resource locator (URL), a uniform resource identifier (URI), an object ID, a key, and/or the like.

Object Stores with Caching

Figure 2:
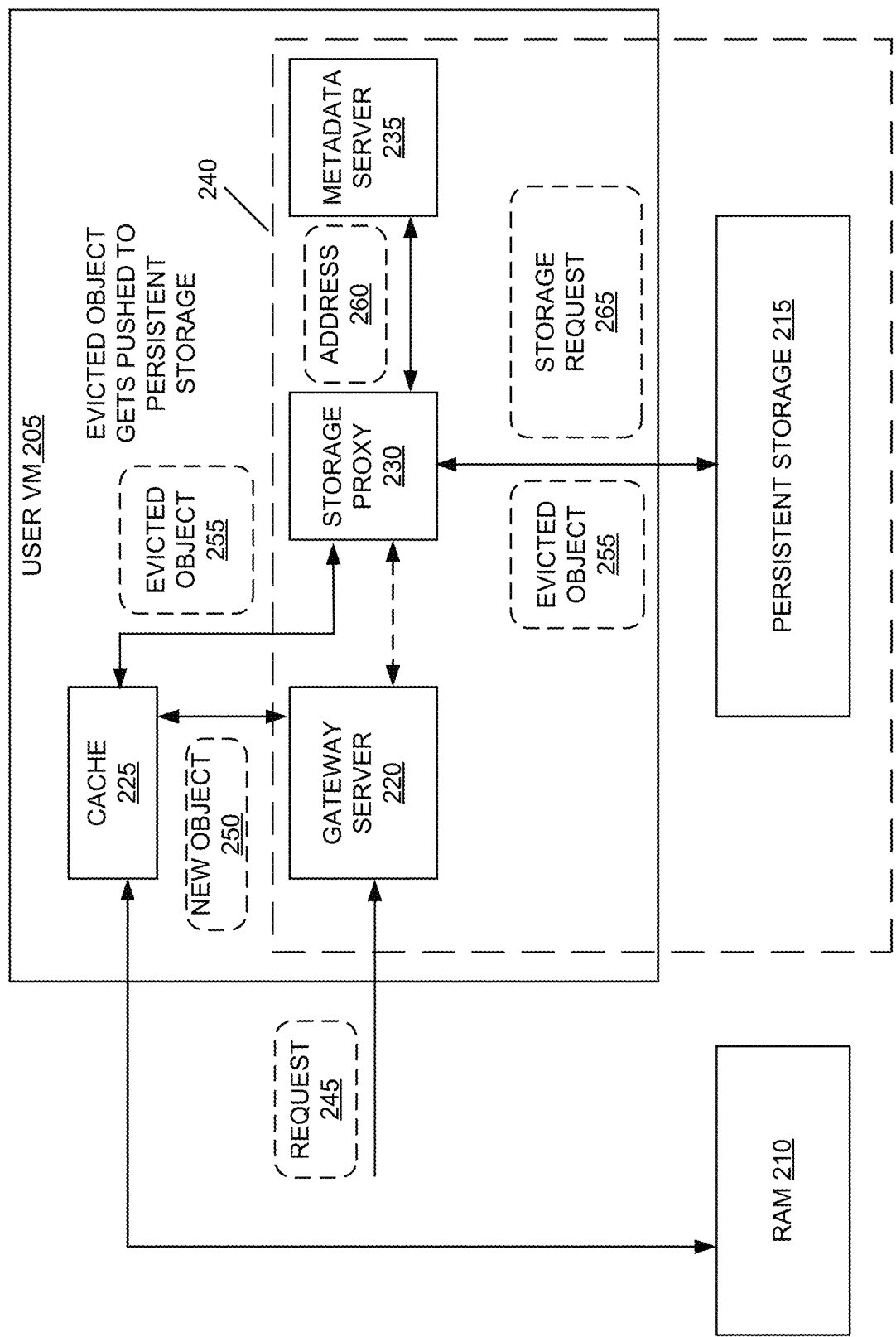
FIG. 2 is an example embodiment of a node for accelerating object stores with distributed caching, in accordance with some embodiments of the present disclosure.

Referring now to FIG. 2, an example embodiment of a node 200 for accelerating object stores with distributed caching is shown. In brief overview, the node 200 includes a user VM 205, RAM 210, and persistent storage 215. The user VM 205 includes a gateway server 220, a cache 225, a storage proxy 230, and a metadata server 235. The gateway server 220, the storage proxy 230, the metadata server 235, and the persistent storage 215 may be collectively referred to herein as an object store 240.

The node 200 may be an instance of the node 105 with respect to FIG. 1. The user VM 205 may be instance of user VM 120A. The RAM 210 may be RAM hardware (e.g. one or more chips located on the node 105). The RAM 210 may be an instance of, or a portion of an instance of, the DAS 180A. The persistent storage 215 may be an instance of, or a portion of an instance of, the storage pool 170, the DAS 180A, the cloud storage 185, or the local storage 190.

In some embodiments of the node 200, the components may be distributed across multiple user VMs similar to the user VM 205. For example, the gateway server 220 may be in a first user VM, the cache 225 may be in a second user VM, the storage proxy 230 may be in a third user VM, and the metadata server 235 may be in a fourth user VM. In some embodiments, the components may be distributed across multiple nodes similar to the node 200. For example, the gateway server 220 may be in a first node, the cache 225 may be in a second node, the storage proxy 230 may be in a third node, and the metadata server 235 may be in a fourth node. In some embodiments, one or more nodes may be dedicated to one instance of one or more of the components. For example, a first node may be the gateway server 220.

Although one gateway server (e.g. the gateway server 220) is shown in the node 200, in other embodiments, greater than one gateway server may be used in the node 200 or across multiple nodes similar to the node 200. Although one cache (e.g. the cache 225) is shown in the node 200, in other embodiments, greater than one cache may be used in the node 200 or across multiple nodes similar to the node 200. Each cache may be associated with its own RAM similar to RAM 210. Although one storage proxy (e.g. the storage proxy 230) is shown in the node 200, in other embodiments, greater than one storage proxy may be used in the node 200 or across multiple nodes similar to the node 200. Although one metadata server (e.g. the metadata server 235) is shown in the node 200, in other embodiments, greater than one metadata server may be used in the node 200 or across multiple nodes similar to the node 200. Although one object store (e.g. the object store 240) is shown in the node 200, in other embodiments, greater than one object store may be used in the node 200 or across multiple nodes similar to the node 200. Each object store may be associated with its own cache similar to the cache 225.

The gateway server 220 may be configured to interface with a client device or an intermediary such as a namespace server serving multiple gateway servers. The client device may be a mobile device, a desktop device, and/or the like. The gateway server 220 may be configured to receive a request 245 from the client to store an object. The gateway server 220 may be configured to receive the request 245 through a private network, such as a private cloud network, or a public network, such as the internet. The request may be structured as a web-based application programming interface (API), such representational state transfer (REST) API or a simple object access protocol (SOAP) API.

Figure 3:
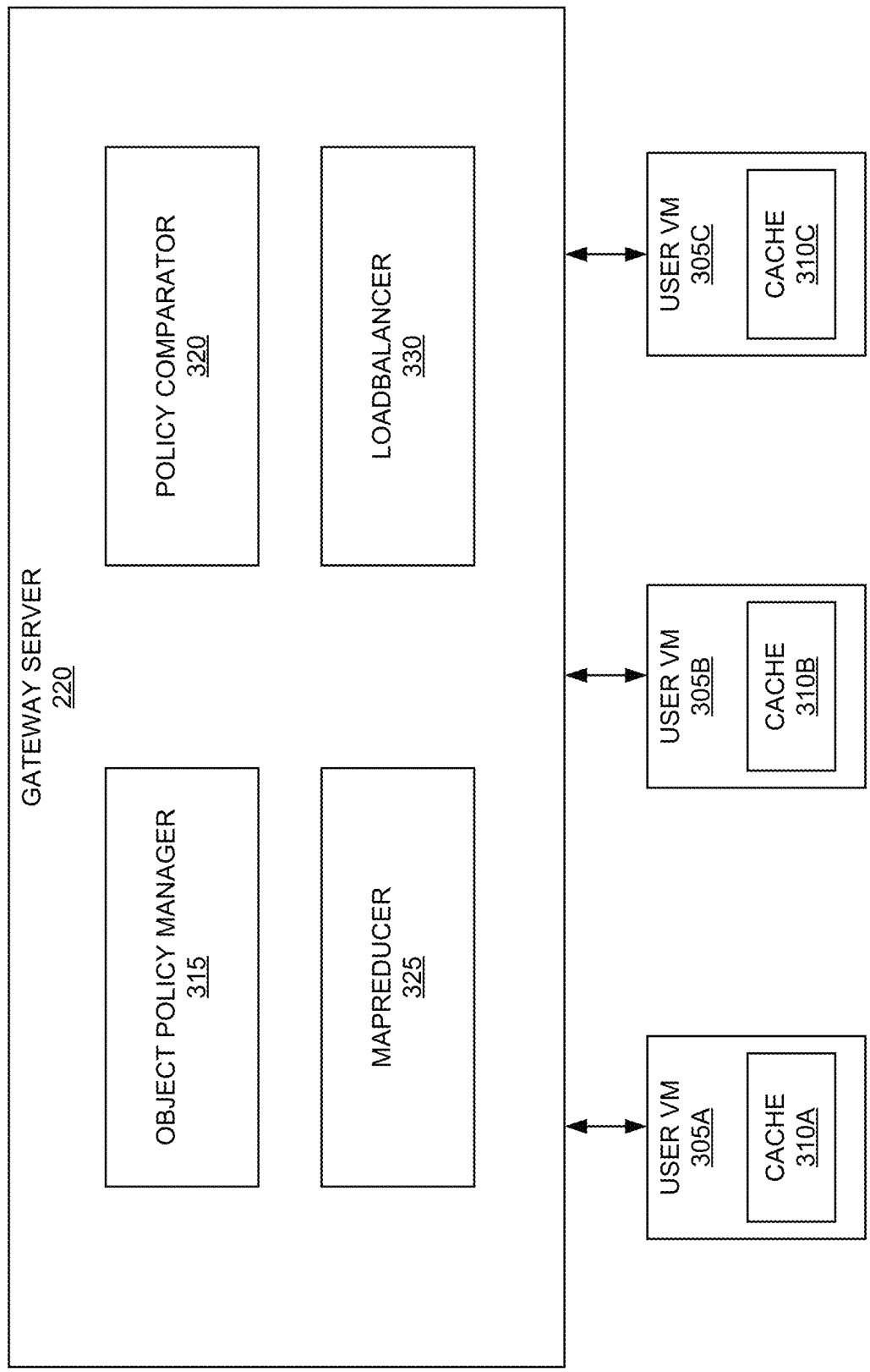
FIG. 3 is an example embodiment of an environment for accelerating object stores with distributed caching, in accordance with some embodiments of the present disclosure.

Referring to FIG. 3, the gateway server 220 may include an object policy manager 315. The object policy manager 315 is configured to manage the object during its lifecycle. The object policy manager 315 may be configured to indicate a required bandwidth and latency for the object. The object policy manager 315 may be configured to indicate how many copies of the object should be made. The object policy manager 315 may be configured to indicate how often the object should be backed up. The object policy manager 315 may indicate rules for legal compliance. The object policy manager 315 may indicate rules for user permissions (e.g. whether the object can be written to by some or all users). The object policy manager 315 may indicate rules for when an object should be evicted. The object policy manager 315 may indicate rules for determining an importance of the object. The object policy manager 315 may indicate rules for what features are accessible to users, or what object processing performance the user is entitled to, based on the services the users subscribed to. The object policy manager 315 may be configured to vary the requirements or the rules of the object based on a stage in the lifecycle that the object is in. The gateway server 220 may be configured to determine the stage in the lifecycle by comparing a difference of a current time to a time the object was initially stored in the node 200 to one or more threshold time periods.

The gateway server 220 may include a policy comparator 320. The policy comparator 320 may be configured to compare an object's properties to specified object properties in an object policy that is managed by the object policy manager 315. For example, the policy may state that the objects to be stored on cache are WORM objects of a size below a threshold size. The policy comparator 320 may be configured to determine whether the object type is a WORM object by, for example, looking at permission bits in the object metadata. The policy comparator 320 may be configured to compare a size (e.g. in bytes) of the object to a threshold size. The object policy manager 315 or a user of the user VM 205 may set and adjust the threshold size. The gateway server 220 may send the object to the cache 225 responsive to the policy comparator 320 determining that the object has the properties which in accordance with the object policy. The policy comparator 320 may be configured to make similar policy decisions that apply to versioned objects. In another example, the object policy may state that the objects of users who have subscribed to a pre-determined premium service may be stored in the distributed cache. The policy comparator 320 may be configured to read the metadata associated with the objects to determine whether the user of the objects has subscribed to the premium service.

The gateway server 220 may include a mapreducer 325. The mapreducer 325 may be configured to split up the object into a plurality of smaller objects, referred to herein as shards. The mapreducer 325 may be configured to split up the object into two or more uniform sized shards or two or more shards of various sizes. In some embodiments, the mapreducer 325 is configured to split up the object into the one or more shards responsive to determining that separating the object is in accordance to the object policy manager 315. The mapreducer 325 may be configured to split up the object into the one or more shards responsive to determining that the request to store the object includes a request to split up the object. The mapreducer 325 may be configured to split up the object into the one or more shards responsive to determining that the object is a WORM object (e.g. a read-only object) upon being stored. The mapreducer 325 may be configured to split up the object into the one or more shards responsive to the object being a certain type of object or having a certain level of importance. The mapreducer 325 may be configured to include erasure code protection to each one of the one or more shards. The mapreducer may be configured to distribute the shards to a distributed cache cluster. In some embodiments, the mapreducer 325 is configured to send code to each of the user VMs to process the shards in parallel.

The mapreducer 325 may be configured to create input objects and/or intermediate objects to assist in splitting up other objects (referred to herein as primary objects) and to distribute the shards of the primary objects to a distributed cache cluster. For example, the mapreducer 325 may create scheduler files which are responsible for scheduling the objects to be split up. The mapreducer 325 may be configured to store the input objects and/or intermediate objects in the distributed cache cluster until the task of splitting up and distributing primary objects is completed. In response to completing the task, the mapreducer 325 may be configured to permanently delete the input objects and/or intermediate objects. In some embodiments, the mapreducer 325 sets a variable associated with each of the input objects and/or intermediate objects that represents a duration of the input object and/or intermediate object. In response to the duration expiring, the mapreducer 325 may permanently delete the input object and/or intermediate object. The variable may be decreased by a pre-fixed value once every pre-fixed number of clock cycles. The duration may expire when the variable reaches a pre-fixed value (for example, zero). Once the mapreducer 325 permanently deletes the input objects and/or intermediate objects, they may no longer accessible, even via the persistent storage 215. Storing the input objects and/or intermediate objects in the distributed cache cluster to be used in completing tasks (such as splitting up and distributing primary objects) and permanently deleting the input objects and/or intermediate objects at a later time is advantageous for reducing latency of reads and writes associated with the tasks.

The gateway server 220 may include a loadbalancer 330. The loadbalancer 330 may be configured to determine to which of the one or more caches to distribute the object or the one or more shards. The loadbalancer 330 may be configured to distribute the object or some of the one or more shards to a first cache on a first user VM (e.g. user VM 205) responsive to determining that the user VM 205 has a lower CPU utilization than some or all of the other user VMs in an environment (e.g. the node 200, a cluster, a datacenter, and/or a cloud). The loadbalancer 330 may be configured to distribute the object or some of the one or more shards to the first cache on the first user VM responsive to determining that the user VM 205 has a latency (e.g. I/O latency) lower than the latency of some or all of the other user VMs in the environment. The loadbalancer 330 may be configured to distribute the object or some of the one or more shards to the first cache on the first user VM responsive to determining that the user VM 205 has a latency-bandwidth (e.g. I/O per second, also known as IOPS) lower than some or all of the other user VMs in the environment. The loadbalancer 330 may be configured to distribute the object or some of the one or more shards to the first cache on the first user VM (e.g. user VM 205) responsive to determining that a function of the CPU utilization and the latency is lower than that of some or all of the other user VMs in the environment. The loadbalancer 330 may be configured to distribute the object or some of the one or more shards to the first cache on the first user VM on a first node responsive to (a) determining that the first node has the best performance (e.g. latency, CPU utilization, latency-bandwidth, a combination thereof) of all of the nodes in the cluster, datacenter, or cloud; and (b) determining that the first user VM has the best performance of all of the user VMs on the first node.

Referring back to FIG. 2, the cache 225 may be configured to interface with the object store. The cache 225 may be a cluster of distributed caches. Although not shown, the cache cluster may be distributed across multiple user VMs and may be further distributed across multiple nodes. The cache 225 may be configured to store a new object 250 received from the gateway server 220. The new object 250 may be associated with the request 245 from the client device or the intermediary. The cache 225 may be configured to receive the new object 250 and a unique identifier (e.g. a key) corresponding to, or within, the new object 250. In some embodiments, the unique identifier is an index (or address) associated with the cache 225. In some embodiments, the gateway server 220 assigns the unique identifier to an index in a lookup table (LUT). Upon receiving the new object 250 and the unique identifier, the cache 225 may be configured to store the new object 250 in a memory location corresponding to the index. The memory may be located in the RAM 210. The cache 225 may be configured to retrieve the new object 250 at a time after the new object 250 was stored. The cache 225 may be configured to retrieve the new object 250 responsive to receiving the unique identifier. The cache 225 may be configured to retrieve the new object 250 at a memory location corresponding to an index indicated by, or mapped to, the unique identifier.

In some embodiments, the unique identifier is a key. In some embodiments, the cache 225 may include a first hashing algorithm. The cache may be configured to perform a first hash by applying the first hashing algorithm to the key to generate the index associated with the memory location where the new object 250 is to be stored or retrieved. The gateway server 220 may include a second hashing algorithm. The gateway server 220 may perform a second hash by applying the second hashing algorithm to the key to determine which cache to send the new object 250 to or to retrieve the new object 250 from. In some embodiments, the indices corresponding to memory locations in each cache of each node are unique. Thus, the gateway server 220 may be configured to apply the second hashing algorithm to key to generate the index associated with the node, the cache, and/or the memory location where the new object 250 is to be stored or retrieved. The client device may include a third hashing algorithm. The client device may perform a third hash by applying the third hashing algorithm to the key to determine which node to send the new object 250 to or to retrieve the new object 250 from. The first hashing algorithm, the second hashing algorithm, and the third hashing algorithm may be the same or different from each other. The hashing algorithms may include HMAC, SHA-1, SHA-2, SHA-3, MD2, MD4, MD5, MD6, Whirlpool, and/or the like. In some embodiments, a component may perform a hash of a hash. For example, upon performing the third hash to the key, the client device may send the hashed key to the gateway server 220. Upon receiving the hashed key, the gateway server may perform the second hash to the hashed key to determine which cache and which memory location the new object 250 may be stored on or written to.

The cache 225 may be configured to evict objects. The cache 225 may be configured to evict objects in accordance with the object policy manager 315. The cache 225 may be configured to evict an evicted object 255 responsive to: (a) receiving the new object 250; (b) the cache 225 being full (e.g. no available memory locations); and (c) the evicted object 255 meeting some criteria such as being a least recently used (LRU) object of the objects in the cache 225. In some embodiments, the gateway server 220 sends the criteria for determining which object to evict to the cache 225. Responsive to determining the evicted object 255, the cache 225 may be configured to send the evicted object 255 to the storage proxy 230 and to overwrite the memory location in the cache 225 where the evicted object 255 was stored. In some embodiments, objects are split up into shards and stored on different caches of a distributed cache cluster. The object whose most recently used shard is least recently used as compared with other objects' most recently used shards is the LRU object. In some embodiments, responsive to determining the evicted object 255, the cache 225 may be configured to discard the evicted object 255 (i.e. not send the objects to the storage proxy 230, and ultimately, the persistent storage 215). For example, the evicted object 255 may be ephemeral data only designed to last for a small duration. The cache 225 or some other component of the node 200 may be configured to determine whether the evicted object 255 is to be discarded by reading metadata associated with the evicted object 255 or by determining from an object policy associated with the evicted object 255 whether the evicted object 255 may be discarded.

The storage proxy 230 may be configured to send a request to the metadata server 235 for an address 260 associated with the evicted object 255. The request may include the unique identifier (e.g. the key). The metadata server 235 may be configured to search a first array to find the unique identifier. The metadata server 235 may be configured to send the address 260 corresponding to an index to the storage proxy 230 responsive to finding the unique identifier at the index. The metadata server 235 may be configured to assign the unique identifier to a next address at a next index and send the next address to the storage proxy 230 responsive to determining that the unique identifier is not at any of the indices.

The storage proxy 230 may be configured to send a storage request 265 to the persistent storage 215. The storage request 265 may be a write request and may include the evicted object 255 and the address 260. The persistent storage 215 may be configured to store the evicted object 255 at the address 260 provided by the storage proxy 230. The storage request 265 may be a read request and may include the address 260. The persistent storage 215 may be configured to retrieve the evicted object 255 at the address 260 provided by the storage proxy 230. The storage request 265 may be a web-based API, a database API, and/or the like.

In some embodiments, the gateway server 220 is configured to send a request 245 for reading the evicted object 255 to the storage proxy 230 responsive to the gateway server 220 determining that the evicted object 255 is not stored in the cache 225. The storage proxy 230, the metadata server 236, and the persistent storage 215 may be configured to perform the steps described above in order to send the evicted object 255 to the gateway server 220. In some embodiments, the gateway server 220 is configured to send the new object 250 to persistent storage responsive to some criteria of an object policy not being met (e.g. size larger than a threshold and/or no indication to split up the object). The storage proxy 230, the metadata server 236, and the persistent storage 215 may be configured to perform the steps described above in order to store the new object 250, and later, to send the new object 250 to the gateway server 220.

Referring now to FIG. 3, an example embodiment of an environment 300 for accelerating object stores with distributed caching is shown. In brief overview, the environment 300 includes a user VM 305A, a user VM 305B, a user VM 305C, and a gateway server 220. The user VM 305A includes a cache 310A. The user VM 305B includes a cache 310B. The user VM 305C includes a cache 310C. As described above, the gateway server 220 may include the object policy manager 315, the policy comparator 320, the mapreducer 325, and the loadbalancer 330.

Each of the user VM 305A, the user VM 305B, and the user VM 305C may be an instance of may be an instance of the user VM 120A. Although one gateway server (e.g. the gateway server 220) is shown in the environment 300, in other embodiments, greater than one gateway server may be used in the environment 300. Although three user VMs (e.g. the user VM 305A, the user VM 305B, and the user VM 305C) are shown in the environment 300, in other embodiments, greater than or less than three user VMs may be used in the environment 300. Although each of the user VMs is shown to include one cache (e.g. the user VM 305A is shown to include the cache 310A), in other embodiments, greater than one cache may be included in some or all of the user VMs in the environment 300.

In some embodiments, the environment 300 is a node similar to node 105. The gateway server 220 may be in a user VM in the node. In some embodiments, the environment 300 is a cluster of nodes. The gateway server 220 and the user VMs 305A, 305B, and 305C may be spread across different nodes in the cluster. In some embodiments, the environment 300 is a cloud or a datacenter. The gateway server 220 and the user VMs 305A, 305B, and 305C may be spread across clusters or datacenters.

Each of the elements or entities of the virtual computing system 100, the node 200, and the environment 300 (e.g. the gateway server 220, the cache 225, the storage proxy 230, the metadata server 235, the object policy manager 315, the policy comparator 320, the mapreducer 325, and the loadbalancer 330), is implemented using hardware or a combination of hardware or software, in one or more embodiments. For instance, each of these elements or entities can include any application, program, library, script, task, service, process or any type and form of executable instructions executing on hardware of the virtual computing system 100, the node 200, and/or the environment 300. The hardware includes circuitry such as one or more processors (e.g. the processing unit 192A) in one or more embodiments. Each of the one or more processors is hardware. In some embodiments, the cache 225 is a portion of the RAM 210. In some embodiments, the RAM 210 is in the cache 225.

Referring now to FIG. 4, an example method 400 for storing an object in a distributed cache is shown. The method 400 for storing an object in cache may be implemented using, or performed by, the components of the node 200 or the environment 300, both of which are detailed herein with respect to FIG. 2 and FIG. 3. Additional, fewer, or different operations may be performed in the method 400 depending on the embodiment. In brief overview of the method 400, a gateway server receives a request to store an object (405). The gateway server determines whether the object satisfies an object policy (410). The gateway server stores the object in persistent storage responsive to determining that the object does not satisfy the object policy (415). The gateway server determines whether there is an indication to split up the object responsive to the gateway server determining that the object does satisfies the object policy (420). The gateway server mapreduces the object responsive to determining that there is an indication to split up the object (425). The gateway server stores the object in a cache responsive to the gateway server determining that there is no indication to split up the object or responsive the gateway server mapreducing the object (430).

At operation 405, a gateway server, such as the gateway server 220, receives a request to store an object, such as the request 245. Receiving the request to store the object may include receiving the request from a client device. Receiving the request to store the object may include receiving the object. Receiving the object may include receiving data, metadata, and/or a unique identifier. Receiving the unique identifier may include receiving a URL, an object ID, and/or a key.

At operation 410, the gateway server determines whether the object satisfies an object policy. Determining whether the object satisfies the object policy may include determining whether the object is a WORM object, a versioned object, a read-only object, or the like. In some embodiments, WORM objects and versioned objects include read-only objects. Determining whether the object satisfies the object policy may include determining what service a user associated with the object is subscribed to. Determining whether the object satisfies the object policy may include reading metadata such as permission metadata, metadata identifying the user, or metadata specifying what service the user is subscribed to. Determining whether the object satisfies the object policy may include determining whether a size of the object is greater than a threshold size in accordance with the object policy. Determining whether the size of the object is greater than the threshold size may include accessing an object policy in object policy manager, such as the object policy manager 315, to determine the threshold size. Determining whether the size of the object is greater than the threshold size may include requesting the threshold size from a user associated with a client device that sent the request to store the object. Determining whether the size of the object is greater than the threshold size may include comparing the threshold size to the size of the object.

At operation 415, the gateway server stores the object in persistent storage, such as the persistent storage 215, responsive to determining that the object does not satisfy the object policy. Storing the object in persistent storage may include sending, by the gateway server, the object to a storage proxy, such as the storage proxy 230. Storing the object in persistent storage may include requesting, by the storage proxy, an address of where to store the object from a metadata server, such as the metadata server 235. Storing the object in persistent storage may include storing, by the storage proxy, the object in the persistent storage at the address received from the metadata server.

At operation 420, the gateway server determines whether there is an indication to split up the object responsive to the gateway server determining that the object does satisfies the object policy. Determining whether there is the indication to split up the object may include accessing, by the gateway server, the object policy the object policy manager to determine the criteria that is to be satisfied. For example, only the objects which are designated as read-only, such as static web content, archival images, or multimedia files, are to be split up in accordance with the object policy. Determining whether there is the indication to split up the object may include reading, by the gateway server, the metadata of the object to determine if satisfies the criteria in accordance with the object policy. For example, the gateway server may read user permission data to determine if the object is read-only for some or all of the users. Determining whether there is the indication to split up the object may include reading, by the gateway server, the request from the client device to determine if the request includes a request to split up the object. In some embodiments, the data can be split up on request even if the object is not read-only.

At operation 425, the gateway server mapreduces the object responsive to determining that there is an indication to split up the object. Mapreducing the object may include splitting up, by the gateway server, the object into shards. Mapreducing the object may include adding erasure code protection to each one of the one or more shards. In some embodiments, responsive to mapreducing, the gateway server determines whether each of the shards have a size less than the threshold size. Mapreducing the object may include iterating the mapreduction until each of the shards have a size smaller than the threshold size.

At operation 430, the gateway server stores the object in a cache, such as the cache 225, responsive to the gateway server determining that there is no indication to split up the object or responsive the gateway server mapreducing the object. Storing the object in the cache may include determining, by the gateway server, a pre-determined number of caches having the lowest latency among all of the caches in a same environment (e.g. node, cluster, datacenter, or cloud) as the gateway server. Storing the object in the cache may include distributing, by the gateway server, the shards of the object to each of the pre-determined number of caches determined to have the lowest latency. Latency may be measured or approximated as time it takes from file in cache to be retrieved by the client device.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An object store comprising:
    a distributed cache cluster including a first cache on a first node device and a second cache on a second node device;
    a server communicatively coupled to the distributed cache cluster, wherein the server has programmed instructions that:
        determine whether an object satisfies an object policy;
        determine whether a request to store the object indicates that the object is to be split up into a plurality of shards; and
        store a first shard of the plurality of shards in the first cache and a second shard of the plurality of shards in the second cache.

2. The object store of claim 1, wherein the server has further programmed instructions that determine whether the object satisfies an object policy by:
    determining whether the object is a read-only object; and
    comparing a size of the object to a threshold size.

3. The object store of claim 1, wherein the server has further programmed instructions that determine whether the request indicates that the object is to be split up into the plurality of shards responsive to determining that the object satisfies the object policy.

4. The object store of claim 1, wherein determining whether the request indicates that the object is to be split up into the plurality of shards includes:
    accessing the object policy to determine a criteria; and
    reading metadata of the object to determine whether the criteria is satisfied.

5. The object store of claim 4, wherein the criteria is that the object is a read-only object.

6. The object store of claim 1, wherein the server has further programmed instructions that store the first shard to the first cache and the second shard to the second cache responsive to determining that the first cache and the second cache have a lowest latency of the distributed cache cluster.

7. The object store of claim 1, further including a storage proxy, wherein the server has further programmed instructions that forward the request to store the object to the storage proxy responsive to determining that the object does not satisfy an object policy.

8. The object store of claim 1, wherein the object includes a key, wherein the server has further programmed instructions that determine that the first shard is stored in the first cache and the second shard is stored in the second cache by performing a hash on the key.

9. The object store of claim 1, wherein the server has further programmed instructions that cause the distributed cache cluster to evict a least recently used object.

10. The object store of claim 1, wherein the server is a third node device different from the first node device and the second node device.

11. A method comprising:
    determining, by a server, whether an object satisfies an object policy;
    determining, by the server, whether a request to store the object indicates that the object is to be split up into a plurality of shards; and
    storing, by the server, a first shard of the plurality of shards in a first cache and a second shard of the plurality of shards in a second cache,
    wherein the first cache is located on a first node device, and the second cache is located on a second node device.

12. The method of claim 11, wherein determining, by the server, whether the object satisfies an object policy by:
    determining, by the server, whether the object is a read-only object; and
    comparing, by the server, a size of the object to a threshold size.

13. The method of claim 11, wherein determining, by the server, whether the request indicates that the object is to be split up into the plurality of shards is responsive to determining that the object satisfies the object policy.

14. The method of claim 11, wherein determining, by the server, whether the request indicates that the object is to be split up into the plurality of shards includes:
    accessing, by the server, an object policy to determine a criteria; and
    reading, by the server, metadata of the object to determine whether the criteria is satisfied.

15. The method of claim 14, wherein the criteria is that the object is a read-only object.

16. The method of claim 11, wherein storing, by the server, the first shard to the first cache and the second shard to the second cache is responsive to determining that the first cache and the second cache have a lowest latency.

17. The method of claim 11, further comprising forwarding, by the server, the request to store the object to a storage proxy responsive to determining that the object does not satisfy an object policy.

18. The method of claim 11, wherein the object includes a key, wherein the server determines that the first shard is stored in the first cache and the second shard is stored in the second cache by performing a hash on the key.

19. The method of claim 11, further comprising causing, by the server, the first cache to evict a least recently used object.

20. The method of claim 11, wherein the server is a third node device different from the first node device and the second node device.

21. A non-transitory computer readable media with computer-executable instructions embodied thereon that, when executed by a processor, cause the entity management system to perform a process comprising:
    determining whether an object satisfies an object policy;
    determining whether a request to store the object indicates that the object is to be split up into a plurality of shards; and
    storing a first shard of the plurality of shards in a first cache and a second shard of the plurality of shards in a second cache,
    wherein the first cache is located on a first node device, and the second cache is located on a second node device.

22. The non-transitory computer readable media of claim 21, wherein storing the first shard to the first cache and the second shard to the second cache is responsive to determining that the first cache and the second cache have a lowest latency.

23. The non-transitory computer readable media of claim 21, further comprising forwarding the request to store the object to a storage proxy responsive to determining that the object does not satisfy an object policy.

24. The non-transitory computer readable media of claim 21, wherein the object includes a key and further comprising determining that the first shard is stored in the first cache and the second shard is stored in the second cache by performing a hash on the key.

25. The non-transitory computer readable media of claim 21, wherein determining whether the object satisfies an object policy by:
   determining whether the object is a read-only object; and
   comparing a size of the object to a threshold size.

26. The non-transitory computer readable media of claim 21, wherein determining whether the request indicates that the object is to be split up into the plurality of shards is responsive to determining that the object satisfies the object policy.

27. The non-transitory computer readable media of claim 21, wherein determining whether the request indicates that the object is to be split up into the plurality of shards includes:
   accessing an object policy to determine a criteria; and
   reading metadata of the object to determine whether the criteria is satisfied.

* * * * *